US008823461B2

(12) United States Patent
Shi et al.

(10) Patent No.: US 8,823,461 B2
(45) Date of Patent: Sep. 2, 2014

(54) MICROWAVE ADAPTORS AND RELATED OSCILLATOR SYSTEMS

(75) Inventors: Tiefeng Shi, Gilbert, AZ (US); Jun Li, Chengdu (CN)

(73) Assignee: Freescale Semiconductor, Inc., Austin, TX (US)

( * ) Notice: Subject to any disclaimer, the term of this patent is extended or adjusted under 35 U.S.C. 154(b) by 47 days.

(21) Appl. No.: 13/607,732

(22) Filed: Sep. 9, 2012

(65) Prior Publication Data

US 2013/0278345 A1 Oct. 24, 2013

(30) Foreign Application Priority Data

Apr. 20, 2012 (CN) .......................... 2012 1 0251178

(51) Int. Cl.
*H03B 5/18* (2006.01)
*H01Q 13/12* (2006.01)

(52) U.S. Cl.
USPC .......................................... 331/101; 343/767

(58) Field of Classification Search
USPC .............................. 331/101; 343/767; 333/160
See application file for complete search history.

(56) References Cited

U.S. PATENT DOCUMENTS

| 5,216,327 | A | 6/1993 | Myers | |
|---|---|---|---|---|
| 5,343,214 | A * | 8/1994 | Hadzoglou | ................. 343/713 |
| 5,369,335 | A | 11/1994 | Lim | |
| 6,549,800 | B1 * | 4/2003 | Atalar et al. | ................. 600/423 |
| 7,067,779 | B2 | 6/2006 | Mulcahy et al. | |
| 8,129,911 | B2 | 3/2012 | Wilson | |
| 2011/0115678 | A1 * | 5/2011 | Owens | ......................... 343/702 |

* cited by examiner

*Primary Examiner* — Joseph Chang
(74) *Attorney, Agent, or Firm* — Charles E. Bergere

(57) ABSTRACT

An adaptor for a solid-state oscillator and related microwave adaptors includes an input segment of a conductive material, a first coaxial portion that includes a first inner conductor coupled to the input segment and a first outer shielding segment, and a capping portion coupled to the first coaxial portion to electrically couple the first inner conductor and the first outer shielding segment.

20 Claims, 4 Drawing Sheets

MICROWAVE ADAPTORS AND RELATED OSCILLATOR SYSTEMS

BACKGROUND OF THE INVENTION

The present invention is related generally to electronic circuits, and more particularly, to microwave adaptors for solid-state microwave oscillators.

Magnetrons are commonly used to generate microwaves in microwave ovens and other microwave applications. While magnetrons are well suited for use in microwave ovens, they typically require a relatively high voltage power source (e.g., 4 kilovolts or more) for operation. Additionally, the lifetime of some magnetrons may be limited or the magnetrons may otherwise be susceptible to output power degradation over extended periods of operation. Accordingly, it is desirable to provide alternative sources for microwave energy.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
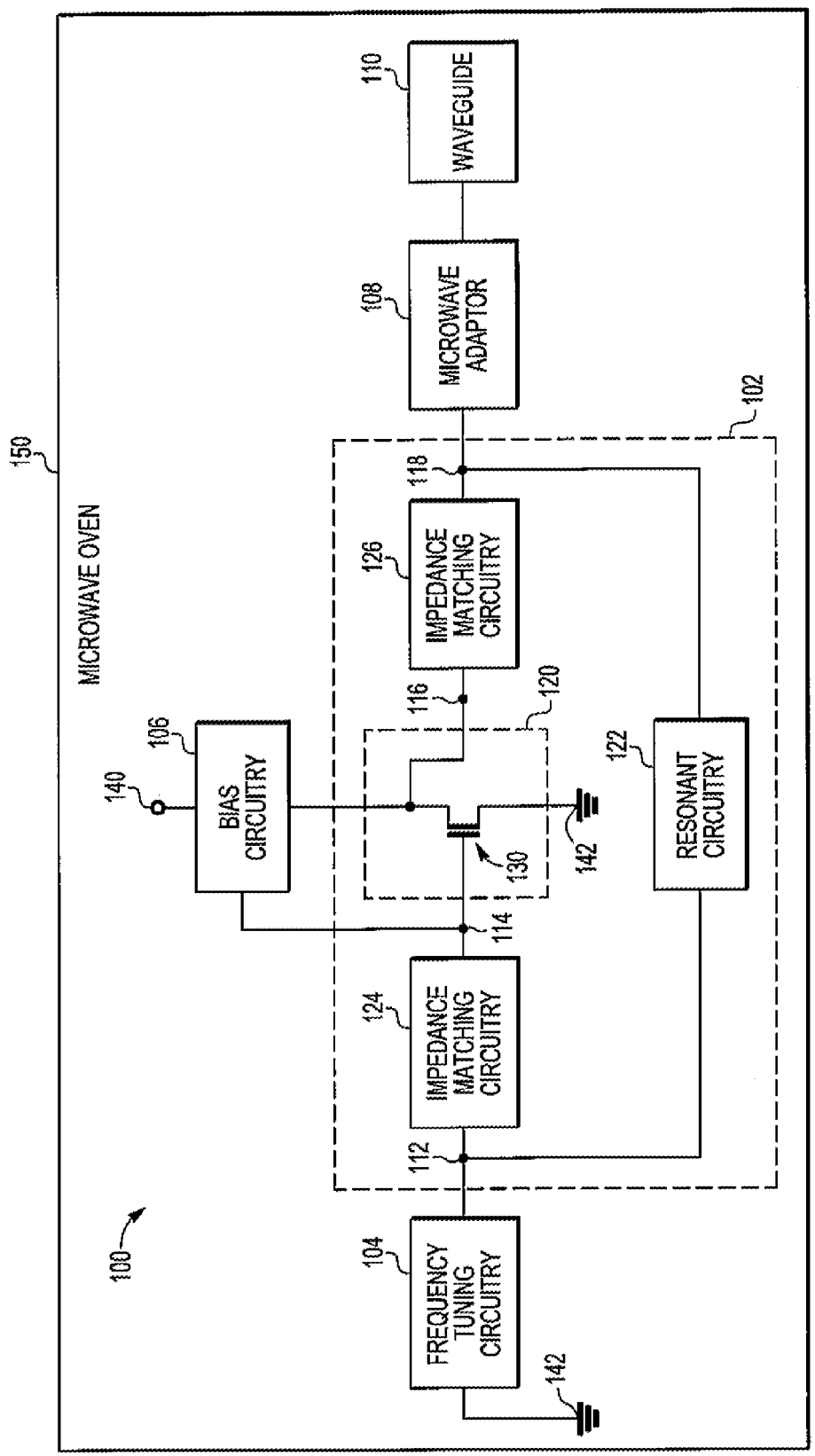
FIG. 1 is a schematic block diagram of an exemplary oscillator system in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state oscillator systems and related adaptors for microwave applications. As described in greater detail below, exemplary oscillator systems are realized using an amplifier arrangement with a resonant circuit in the feedback path. The resonant circuit includes a pair of arcuate (or curved) inductive elements that oppose one another to provide an annular structure. As used herein, an "annular structure" should be understood as referring to a ring-like structure that has a voided interior, but the annular structure need not be perfectly circular. In exemplary embodiments, the arcuate inductive elements have substantially identical and complementary shape and/or dimensions and are capacitively coupled to each other at their opposing ends. In accordance with one or more embodiments, a rectangular inductive element is formed proximate one of the arcuate inductive elements and spaced apart from the respective arcuate inductive element such that rectangular inductive element is capacitively coupled to the arcuate inductive element via the gap capacitance introduced by the air gap between the rectangular inductive element and the arcuate inductive element.

For microwave ovens and related applications, to transfer the output of the oscillator system to a waveguide and/or cavity, an adaptor is provided at the output of the oscillator system that translates the oscillating electrical signals from the output impedance of the amplifier arrangement to the input impedance of the waveguide and/or cavity. As described in greater detail below, an exemplary adaptor includes an input segment of a conductive material, such as a microstrip transmission line, that is coupled to the output of the oscillator system. The adaptor also includes one or more coaxial portions configured to translate the oscillating electrical signals at the output of the oscillator system to the input impedance of the waveguide and/or cavity, and an antenna portion at the end of the one or more coaxial portions. At least the antenna portion is disposed within the waveguide and/or cavity, and the antenna portion electrically couples the inner conductor to the outer shielding segment of the last coaxial portion to radiate electromagnetic signals (or waves) corresponding to the oscillating signals generated by the oscillator system into the waveguide and/or cavity. Although the subject matter is described herein in the context of microwave ovens or other microwave frequency applications, the subject matter is not intended to be limited to any particular frequency range.

Turning now to FIG. 1, in an exemplary embodiment, an oscillator system 100 suitable for use in a microwave oven 150 includes, without limitation, an oscillator arrangement 102, frequency tuning circuitry 104, bias circuitry 106, a microwave adaptor 108, and a waveguide 110. In an exemplary embodiment, the elements of the oscillator system 100 are configured to produce an oscillating electromagnetic signal at the input of the waveguide 110 having a frequency in the microwave frequency range (e.g., 2.45 GHz) with an output power of about 100 Watts or more. It should be understood that FIG. 1 is a simplified representation of an oscillator system 100 for purposes of explanation and ease of description, and that practical embodiments may include other devices and components to provide additional functions and features, and/or the oscillator system 100 may be part of a much larger electrical system, as will be understood.

In an exemplary embodiment, the oscillator arrangement 102 includes an amplifier arrangement 120, resonant circuitry 122, amplifier input impedance matching circuitry 124, and amplifier output impedance matching circuitry 126. The resonant circuitry 122 is coupled between the output node 116 of the amplifier arrangement 120 and the input node 114 of the amplifier arrangement 120 to provide a resonant feedback loop that causes the amplified electrical signals produced by the amplifier arrangement 120 to oscillate at or near the resonant frequency of the resonant circuitry 122. As described in greater detail below, in an exemplary embodiment, the resonant circuitry 122 is configured to provide a resonant frequency of 2.45 GHz, or in other words, the resonant circuitry 122 resonates at 2.45 GHz such that the amplified electrical signals produced by the amplifier arrangement 120 at the amplifier output 116 oscillate at or near 2.45 GHz. It should be noted that in practice, embodiments of the resonant circuitry 122 may be configured to resonate a different frequency to suit the needs of the particular application utilizing the oscillator system 100.

In exemplary embodiments, the amplifier arrangement 120 is realized as one or more transistors having an input terminal (or control terminal) coupled to the amplifier input node 114 and an output terminal coupled to the amplifier output node 116. In the illustrated embodiment, the amplifier arrangement 120 includes a transistor 130 realized as an N-type field effect transistor (FET) having a gate terminal connected to the amplifier input node 114, a drain terminal connected to the amplifier output node 116, and a source terminal connected to a node 142 configured to receive a ground reference voltage for the oscillator system 100. In an exemplary embodiment, the transistor 130 is realized as a laterally diffused metal oxide semiconductor (LDMOS) transistor. However, it should be noted that the transistor 130 is not intended to be limited to any particular semiconductor technology, and in other embodiments, the transistor 130 may be realized as a gallium nitride (GaN) transistor, a MOSFET transistor, a bipolar junction transistor (BJT), or a transistor utilizing another semiconductor technology. Additionally, in other embodiments, the amplifier arrangement 120 may be realized using any suitable amplifier topology and/or the amplifier arrangement 120 may include multiple transistors.

In an exemplary embodiment, the frequency tuning circuitry 104 generally represents the capacitive elements, inductive elements, and/or resistive elements that are configured to adjust the oscillating frequency of the oscillating electrical signals generated by the oscillator system 100. In an exemplary embodiment, the frequency tuning circuitry 104 is coupled between the ground reference voltage node 142 and the input node 112 of the oscillator arrangement 102. The bias circuitry 106 generally represents the circuit elements, components, and/or other hardware that are coupled between the amplifier arrangement 120 and a node 140 configured to receive a positive (or supply) reference voltage. In exemplary embodiments, the voltage difference between the supply voltage node 140 and the ground voltage node 142 is less than 50 Volts. The bias circuitry 106 is configured to control the direct current (DC) or nominal bias voltages at the gate and drain terminals of the transistor 130 to turn the transistor 130 on and maintain the transistor 130 operating in the saturation (or active) mode during operation of the oscillator system 100. In this regard, the bias circuitry 106 is coupled to the gate terminal of the transistor 130 of the amplifier arrangement 120 at the amplifier input node 114 and the drain terminal of the transistor 130 at the amplifier output node 116. In accordance with one or more embodiments, the bias circuitry 106 includes temperature compensation circuitry configured to sense or otherwise detect the temperature of the transistor 130 and adjust the gate bias voltage at the amplifier input node 114 in response to increases and/or decreases in the temperature of the transistor 130 to maintain substantially constant quiescent current for the transistor 130 in response to temperature variations.

As illustrated, the oscillator arrangement 102 includes amplifier input impedance matching circuitry 124 coupled between the resonant circuitry 122 at the input node 112 of the oscillator arrangement 102 and the amplifier input 114, wherein the impedance matching circuitry 124 is configured to match the input impedance of the amplifier arrangement 120 at the amplifier input node 114 to the impedance of the resonant circuitry 122 and the frequency tuning circuitry 104 at node 112 at the resonant frequency of the resonant circuitry 122. Similarly, the amplifier output impedance matching circuitry 126 is coupled between the amplifier output 116 and the resonant circuitry 122 to match the output impedance of the amplifier arrangement 120 at the amplifier output node 116 to the impedance of the resonant circuitry 122 at the output node 118 of the oscillator arrangement 102 at the resonant frequency.

In an exemplary embodiment, the microwave adaptor 108 is realized as a microstrip-to-waveguide adaptor that is coupled between output node 118 of the oscillator arrangement 102 and the input of the waveguide 110 to translate oscillating electrical signals at the output node 118 to electromagnetic signals (or waves) at the oscillating frequency that are provided to the input of the waveguide 110. In exemplary embodiments, the microwave adaptor 108 is configured to match the input impedance of the waveguide 110 to the impedance at the oscillator output node 118 at the resonant frequency. For example, in one embodiment, the input impedance of the waveguide 110 is about 300 ohms and the impedance at the oscillator output node 118 is approximately 50 ohms, wherein the microwave adaptor 108 translates the oscillating electrical signals at approximately 50 ohm impedance to oscillating electrical signals at approximately 300 ohm impedance. In exemplary embodiments, the microwave adaptor 108 includes an antenna portion disposed within the waveguide 110 at or near the input of the waveguide 110, wherein the antenna portion translates the oscillating electrical signals at the 300 ohm impedance to corresponding electromagnetic signals (or waves) at the oscillating frequency that are radiated into or otherwise provided to the input of the waveguide 110. For example, in a microwave oven application where the resonant circuitry 122 is configured to provide a resonant frequency of 2.45 GHz, the microwave adaptor 108 translates the oscillating electrical signals at the oscillator output node 118 to radiated microwave electromagnetic signals at 2.45 GHz provided to the input of the waveguide 110, wherein the waveguide 110 directs the microwave signals into the cavity (or cooking chamber) of the microwave oven 150.

Figure 2:
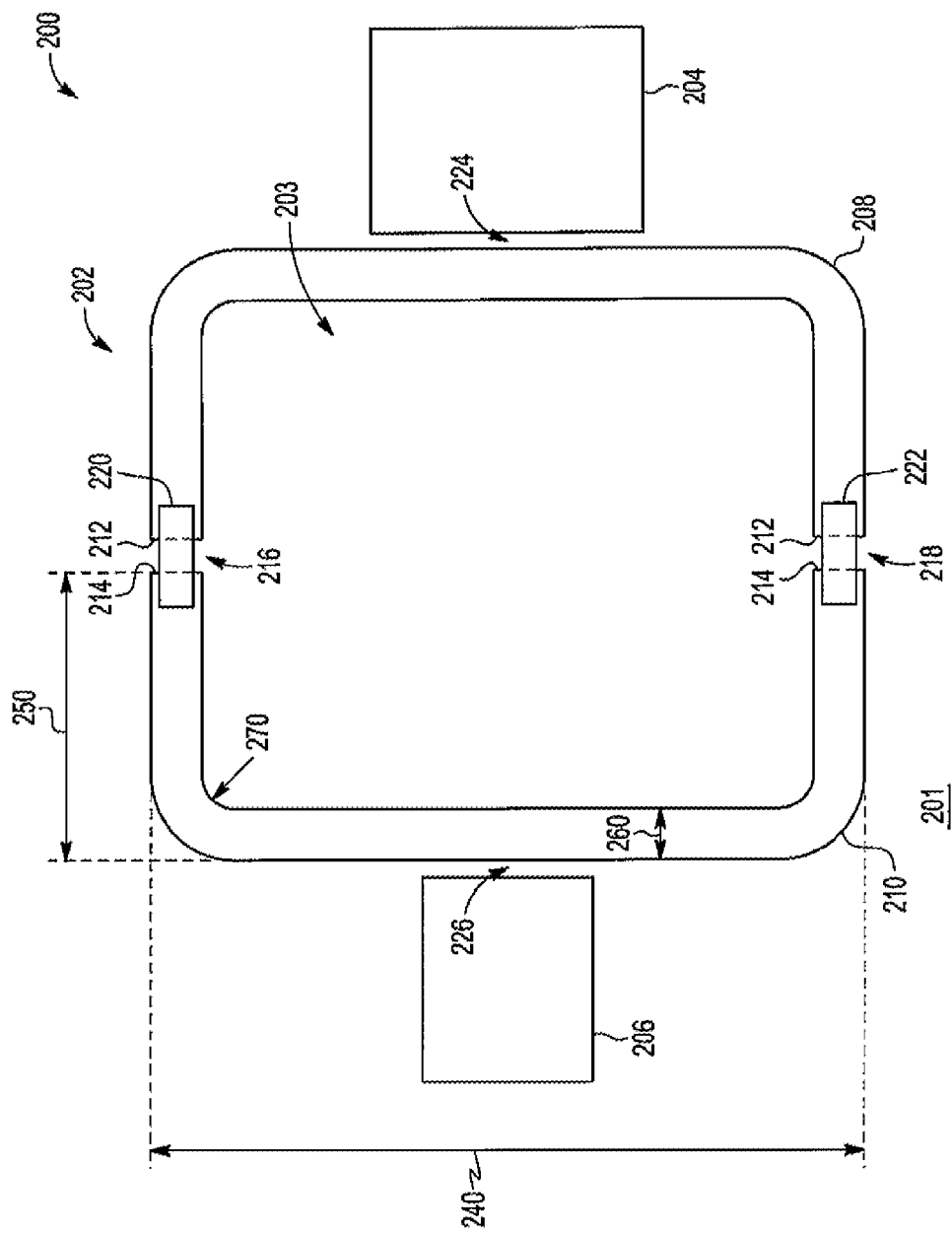
FIG. 2 is a top view of exemplary resonant circuitry suitable for use in the oscillator system of FIG. 1 in accordance with one embodiment of the invention.

FIG. 2 depicts an exemplary embodiment of a resonant circuit 200 suitable for use as the resonant circuitry 122 in the oscillator system 100 of FIG. 1. The resonant circuit 200 includes an annular resonance structure 202 and a pair of inductive elements 204, 206. The annular resonance structure 202 includes a pair of arcuate (or curved) inductive elements 208, 210 that are capacitively coupled at their longitudinal ends 212, 214. The arcuate inductive elements 208, 210 are substantially identical and complementary in shape, such that the arcuate inductive elements 208, 210 provide a symmetrical annular structure 202 having a voided interior region 203 when their longitudinal ends 212, 214 face or otherwise oppose those of the other arcuate inductive element 208, 210, as illustrated in FIG. 2. To put it another way, the arcuate inductive elements 208, 210 are curved inward towards one another to provide a symmetrical annular structure 202 that encompasses a voided interior region 203. By virtue of the inductive elements 208, 210 being substantially identical in shape, the inductive elements 208, 210 have substantially identical electrical characteristics to provide a relatively high quality factor (or Q value) for the resonant circuit 200. In the illustrated embodiment, the arcuate inductive elements 208, 210 are substantially U-shaped such that the annular resonance structure 202 is substantially rectangular with rounded corners, however, in other embodiments, the arcuate inductive elements 208, 210 may substantially C-shaped such that the annular resonance structure 202 is substantially circular. In this regard, the overall shape of the annular resonance structure 202 may vary depending on area or layout requirements or other design constraints for a particular embodiment. In an exemplary embodiment, the inductive elements 208, 210 are each realized as a microstrip or another conductive material (e.g., a conductive metal trace) formed on an electrical substrate 201, such as a printed circuit board. The physical dimensions of the inductive elements 208, 210 are chosen to provide a desired inductance such that the annular resonance structure 202 resonates at a desired frequency. For example, the length and width of the inductive elements 208, 210 may be chosen such that the annular resonance structure 202 resonates at a frequency of about 2.45 GHz. In accordance with one embodiment, to provide a resonant frequency of about 2.45 GHz with a conductive metal material (or microstrip) having a thickness of about 0.0024 inches, the length 240 of each inductive element 208, 210 in a first direction is about 1.03 inches, the length 250 of each inductive element 208, 210 in a second direction orthogonal to the first direction is about 0.42 inches, and the width 260 of each inductive element 208, 210 is about 0.058 inches with an inner radius 270 of about 0.121 inches, wherein the width of the air gaps 216, 218 between the ends of the inductive elements 208, 210 is about 0.02 inches.

As illustrated in FIG. 2, the longitudinal ends 212, 214 of the arcuate inductive elements 208, 210 are spaced apart from one another or otherwise separated to provide air gaps 216, 218 between the longitudinal ends 212, 214 of the inductive elements 208, 210. In the illustrated embodiment, the resonant circuit 200 includes a pair of capacitive elements 220, 222 coupled electrically in series between the inductive elements 208, 210. In an exemplary embodiment, each capacitive element 220, 222 is realized as a capacitor, such as a multilayer ceramic chip capacitor, that is mounted across the air gaps 216, 218 between the longitudinal ends 212, 214 of the inductive elements 208, 210 to provide a substantially continuous annular structure. In this regard, each capacitive element 220, 222 has a first terminal that is mounted, affixed, or otherwise connected to an end 212 of the first arcuate inductive element 208 and a second terminal that is mounted, affixed, or otherwise connected to the opposing end 214 of the second arcuate inductive element 210. In this manner, the capacitive elements 220, 222 are connected electrically in series between the inductive elements 208, 210. In an exemplary embodiment, the capacitances of the capacitive elements 220, 222 are substantially identical and chosen based on the inductances of the inductive elements 208, 210 such that the resonant circuit 200 resonates at a desired frequency. For example, in an exemplary embodiment, the capacitance of the capacitive elements 220, 222 is chosen such that the resonant circuit 200 resonates at a frequency of about 2.45 GHz. In an exemplary embodiment, the capacitance of the capacitive elements 220, 222 is about 2.2 picofarads.

It should be noted that in accordance with one or more alternative embodiments, the resonant circuit 200 may not include capacitive elements 220, 222. In this regard, the capacitive coupling provided by the air gaps 216, 218 between the ends 212, 214 of the inductive elements 208, 210 may provide the desired capacitance such that the resonant circuit 200 resonates at the desired frequency. For example, the physical dimensions and/or shape of the inductive elements 208, 210 may be chosen to provide a desired inductance and the size of the air gaps 216, 218 (i.e., the separation distance between ends 212, 214) may be chosen to provide a desired capacitance (for example, 2.2 picofarads) such that the resonant circuit 200 resonates at the desired resonant frequency without capacitive elements 220, 222.

Still referring to FIG. 2, the inductive elements 204, 206 generally represent the input and output terminals of the resonant circuit 200. For convenience, but without limitation, the first inductive element 204 may alternatively be referred to herein as the input inductive element and the second inductive element 206 may alternatively be referred to herein as the output inductive element. As described in greater detail below with reference to FIG. 1, in exemplary embodiments, the input inductive element 204 is coupled to the output node 118 of the oscillator arrangement 102 and the output inductive element 206 is coupled to the input node 112 of the oscillator arrangement 102.

In the illustrated embodiment of FIG. 2, the input inductive element 204 is realized as a rectangular microstrip (or another conductive material) formed on the electrical substrate 201 proximate the first arcuate inductive element 208. The input inductive element 204 is spaced apart or otherwise separated from the inductive element 208 by an air gap 224 that functions as a gap capacitor electrically in series between the inductive elements 204, 208. In this regard, the input inductive element 204 is capacitively coupled to the inductive element 208 via the gap capacitance provided by the air gap 224. In an exemplary embodiment, the separation distance between the inductive elements 204, 208 (e.g., the width of the air gap 224) is chosen to be as small as possible to increase the quality factor (or Q value) of the gap capacitance. In accordance with one embodiment, the separation distance between the inductive elements 204, 208 is about 0.01 inches or less.

In a similar manner, the output inductive element 206 is realized as another rectangular microstrip (or another conductive material) formed on the electrical substrate 201 proximate the second arcuate inductive element 210. In the illustrated embodiment, the output inductive element 206 is spaced apart or otherwise separated from the inductive element 210 by an air gap 226 that functions as a gap capacitor between the inductive elements 206, 210 in a similar manner as described above with respect to air gap 224. The inductive elements 204, 206 are substantially rectangular in shape, and the dimensions of the respective inductive elements 204, 206 are chosen to provide a desired input and/or output impedance for the resonant circuit 200 at the resonant frequency of the resonant circuit 200, as described in greater detail below. It should be noted that although FIG. 2 depicts air gaps 224, 226 between the both of the inductive elements 204, 206, in accordance with one or more alternative embodiments, one of the inductive elements 204, 206 may be electrically connected to the annular resonance structure 202 without a series capacitance. For example, in accordance with one embodiment, the output inductive element 206 may be formed to physically contact the annular resonance structure 202 and/or arcuate inductive element 210. In this regard, the inductive element 206 may be integrally formed with the arcuate inductive element 210 of the annular resonance structure 202. In an exemplary embodiments, at least one of the inductive elements 204, 206 is separated from the annular resonance structure 202 by an air gap 224, 226 to increase the quality factor (or Q value) of the resonant circuit 200. In an exemplary embodiment, the quality factor (or Q value) of the resonant circuit 200 is about 190 or more.

Fabrication of the resonant circuit 200 may be achieved by forming the inductive elements 204, 206, 208, 210 on the electrical substrate 201 and forming capacitive elements 220, 222 coupled between the longitudinal ends 212, 214 of the arcuate inductive elements 208, 210. In this regard, the fabrication process may begin by forming a layer of conductive material overlying the electrical substrate 201 and selectively removing portions of the conductive material to provide the arcuate inductive elements 208, 210 that define the annular resonance structure 202 having the voided interior region 203 (e.g., an exposed region of the electrical substrate 201 substantially encompassed by the arcuate inductive elements 208, 210) and the inductive elements 204, 206 proximate the arcuate inductive elements 208, 210. As described above, portions of the conductive material between at least one of the inductive elements 204, 206 and a respective arcuate inductive element 208, 210 are removed to provided a gap capacitance in series between that respective inductive element 204, 206 and the respective arcuate inductive element 208, 210 proximate the respective inductive element 204, 206. Additionally, portions of the conductive material are removed to provide air gaps 216, 218 between the longitudinal ends 212, 214 of the arcuate inductive elements 208, 210. After forming the inductive elements 204, 206, 208, 210, the fabrication of the resonant circuit 200 may be completed by mounting, soldering, or otherwise affixing capacitive elements 220, 222 to the longitudinal ends 212, 214 of the arcuate inductive elements 208, 210 that span the air gaps 216, 218 and capacitively couple the arcuate inductive elements 208, 210.

Referring now to FIGS. 1-2, in an exemplary embodiment, the resonant circuitry 122 in the oscillator system 100 is realized as resonant circuit 200 such that the annular resonance structure 202 is coupled between the output of the amplifier arrangement 120 and the input of the amplifier arrangement 120. In this regard, the input inductive element 204 is electrically coupled to node 118 and the output inductive element 206 is electrically coupled to node 112. For example, the amplifier output impedance matching circuitry 126 may include a microstrip formed on the electrical substrate 201 that is connected to or otherwise integral with the input inductive element 204 and the amplifier input impedance matching circuitry 124 may include a second microstrip that is connected to or otherwise integral with the output inductive element 206. The physical dimensions of the input inductive element 204 are chosen to match the input impedance of the resonant circuit 200 to the impedance at node 118, and similarly, the physical dimensions of the output inductive element 206 are chosen to match the output impedance of the resonant circuit 200 to the impedance at node 112. In this regard, in an exemplary embodiment, the impedances of the impedance matching circuitry 124, 126 and the impedances of the inductive elements 204, 206 and air gaps 224, 226 are cooperatively configured to provide a desired gain for the oscillator arrangement 102 at the resonant frequency of the resonant circuitry 122, 200.

Figure 3:
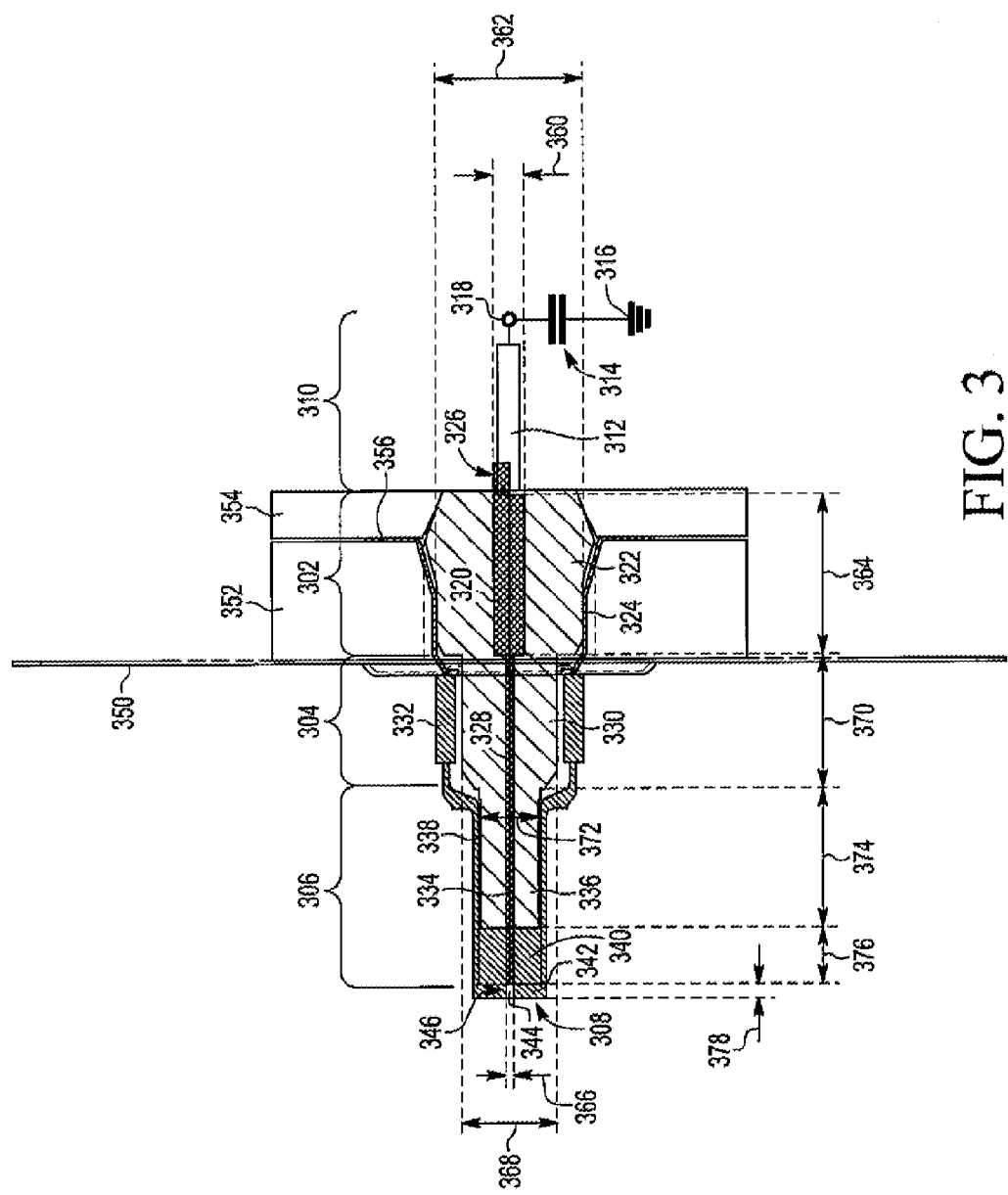
FIG. 3 is a cross-sectional view of an exemplary adaptor suitable for use in the oscillator system of FIG. 1 in accordance with one embodiment of the invention.

FIG. 3 depicts an exemplary embodiment of an adaptor 300 suitable for use as the microwave adaptor 108 in the oscillator system 100 of FIG. 1. The adaptor 300 includes, without limitation, a plurality of coaxial portions 302, 304, 306, an antenna portion 308, and an input impedance matching portion 310. In an exemplary embodiment, the input impedance matching portion 310 includes an input segment 312 of microstrip or another conductive material (e.g., a conductive metal trace) and an input capacitive element 314 coupled between the input segment 312 and a ground reference voltage node 316 (e.g., node 142), wherein the input segment 312 and the capacitive element 314 are configured to match the input impedance at the input node 318 of the microwave adaptor 300 to a node having an oscillating electrical signal (e.g., output node 118) that is coupled to the input node 318 of the microwave adaptor 300. For example, as described in greater detail below in the context of FIG. 4, in accordance with one embodiment when the microwave adaptor 108 is realized as adaptor 300, the capacitive element 314 is realized as a capacitor having a capacitance of about 2.2 picofarads and the input segment 312 is realized as a microstrip transmission line segment having a length chosen to provide an impedance of 50 ohms at 2.45 GHz to match the 50 ohm output impedance of the oscillator arrangement 102 at the output node 118. At least the antenna portion 308 of the microwave adaptor 300 is disposed within a waveguide (e.g., at or near the input of waveguide 110) to radiate oscillating electromagnetic signals (or waves) corresponding to input electrical signals received at the adaptor input node 318 into the waveguide, as described in greater detail below.

The coaxial portions 302, 304, 306 are coupled electrically in series between the input impedance matching portion 310 and the antenna portion 308 to translate the impedance at the adaptor input node 318 to the input impedance of the waveguide (e.g., waveguide 110) where the last coaxial portion 306 is coupled to the antenna portion 308. In exemplary embodiments, the coaxial portions 302, 304, 306 are substantially cylindrical in shape, with each coaxial portion 302, 304, 306 including an inner cylindrical segment of conductive material (or inner conductor), a dielectric material surrounding or otherwise circumscribing the inner conductor, and an outer shielding material surrounding or otherwise circumscribing the dielectric material. For example, in an exemplary embodiment, the first coaxial portion 302 includes an inner cylindrical segment 320 of copper or another suitable conductive material and a surrounding portion 322 of dielectric material, such as Teflon, circumscribing the inner conductor 320. In this regard, the surrounding dielectric portion 322 may be substantially cylindrical with a hollow interior bore (or opening) that corresponds to the diameter and/or circumference of the inner conductor 320. The first coaxial portion 302 also includes an outer shielding segment 324 of copper or another conductive material that circumscribes at least a portion of the surrounding dielectric portion 322. As described in greater detail below, the outer shielding segment 324 includes a flange portion 356 that extends perpendicular to the longitudinal axis of the portion 302 to facilitate mounting and grounding the outer shielding segment 324. As illustrated, an end portion 326 of the inner conductor 320 extends from the surrounding dielectric portion 322 and is electrically connected to the input microstrip segment 312. In accordance with one embodiment, the length of the extension of the end portion 326 is greater than about 5 millimeters to facilitate the electrical connection between the end portion 326 and the input microstrip segment 312. For example, the end portion 326 may be realized as a semi-circular cross-section of the inner conductor 320 (e.g., one half of the cylinder) that is soldered or otherwise affixed to the input microstrip segment 312.

In the illustrated embodiment, the second coaxial portion 304 includes an inner cylindrical segment 328 of copper or another suitable conductive material that is electrically connected to the inner conductor 320 of the first coaxial portion 302, a surrounding portion 330 of dielectric material, and an outer shielding segment 332 of a ceramic material. In an exemplary embodiment, the inner conductor 328 of the second coaxial portion 304 is integral with and/or contiguous to the inner conductor 320 of the first coaxial portion 302, and the surrounding dielectric portion 330 of the second coaxial portion 304 is integral with and/or contiguous to the surrounding dielectric portion 322 of the first coaxial portion 302. Similarly, the third coaxial portion 306 includes an inner cylindrical segment 334 of copper or another suitable conductive material that is electrically connected to the inner conductor 328 of the second coaxial portion 304, a surrounding portion 336 of dielectric material, and an outer shielding segment 338 of copper or another conductive material, wherein the inner conductor 334 of the third coaxial portion 306 is integral with and/or contiguous to the inner conductor 328 of the second coaxial portion 304 and the surrounding dielectric portion 336 is integral with and/or contiguous to the surrounding dielectric portion 330. Accordingly, the inner conductors 320, 328, 334 may be realized as a unitary, contiguous and/or integral cylindrical segment of copper or another conductive material having different diameters and/ or lengths across the different coaxial portions, and; likewise, the surrounding dielectric portions 322, 330, 336 may be realized as a unitary, contiguous and/or integral cylindrical segment of Teflon or another dielectric material having different diameters and/or lengths across different coaxial portions, as described in greater detail below. As illustrated in FIG. 3, the inner conductor 334 and the outer shielding segment 338 of the third coaxial portion 306 extend beyond the surrounding dielectric material 336 to provide a substantially hollow region having the inner conductor 334 disposed therein. As described in greater detail below, the antenna portion 308 is realized as a conductive capping portion disposed within the hollow region defined by the outer shielding segment 338 that electrically connects the inner conductor 334 to the outer shielding segment 338 to facilitate radiation of electromagnetic waves (or signals) from the adaptor 300 into a waveguide, cavity, or the like. In an exemplary embodiment, the outer shielding portions 326, 332, 338 correspond to a magnetron antenna head. To put it another way, the adaptor 300 may be formed by providing the inner conductors 320, 328, 334 and surrounding dielectric portions 322, 330, 336 within the magnetron antenna head and inserting the antenna portion 308 into the end of the magnetron antenna head.

In accordance with one or more exemplary embodiments, each coaxial portion 302, 304, 306 has a different impedance than the other coaxial portions 302, 304, 306. In the illustrated embodiment, each coaxial portion 302, 304, 306 has one or more diameters (or circumferences) that is different from the corresponding diameters (or circumferences) of the other coaxial portions 302, 304, 306. For example, the diameter (or circumference) of the inner conductor 320 of the first coaxial portion 302 (illustrated by arrows 360) is greater than the diameter (or circumference) of the inner conductors 328, 334 of the other coaxial portions 304, 306, and the nominal diameter (or circumference) of the surrounding dielectric portion 322 of the first coaxial portion 302 (illustrated by arrows 362) is greater than the diameter (or circumference) of the surrounding dielectric portions 330, 336 of the other coaxial portions 304, 306. Likewise, while the inner conductors 328, 334 of the second and third coaxial portions 304, 306 have substantially the same diameter (or circumference) (illustrated by arrows 366), the diameter (or circumference) of the surrounding dielectric portion 330 for the second coaxial portion 304 (illustrated by arrows 368) is greater than the diameter (or circumference) of the surrounding dielectric portion 336 for the third coaxial portion 306 (illustrated by arrows 372) and the diameter (or circumference) of the outer shielding portion 332 of the second coaxial portion 304 is greater than the diameter (or circumference) of the outer shielding portion 338 of the third coaxial portion 306.

Still referring to FIG. 3, the antenna portion 308 is realized as a conductive capping portion disposed within the hollow region defined by the extension of the outer shielding portion 338 that electrically connects the inner conductor 334 to the outer shielding portion 338, such that the inner conductor 334 to the outer shielding portion 338 are effectively short-circuited together. The antenna portion 308 includes a cylindrical portion 340 and a cap portion 342 that is integral with the cylindrical portion 340. In an exemplary embodiment, antenna portion 308 includes a central bore 344 (or hole or opening) that extends through the cylindrical portion 340 and the cap portion 342 and has a diameter (or circumference) that is substantially equal to or otherwise corresponds to the diameter (or circumference) of the inner conductor 334, such that the portion of the inner conductor 334 that extends from the surrounding dielectric material 336 into the hollow region defined by the extension of the shielding portion 338 is disposed within the cylindrical portion 340 when the cylindrical portion 340 is inserted within the hollow region, as illustrated in FIG. 3. In this regard, the bore 344 conforms to or is otherwise flush with the inner conductor 334 so that the extending portion of the inner conductor 334 contacts the cylindrical portion 340. The cylindrical portion 340 has a diameter (or outer circumference) that is substantially equal to or otherwise corresponds to the inner circumference of the shielding portion 338 so that the outer circumferential surface of the cylindrical portion 340 contact the inner circumferential surface of the shielding portion 338. Thus, when the portions 340, 342 are realized as a conductive material, such as copper, the antenna portion 308 and/or cylindrical portion 340 electrically connects the inner conductor 334 to the outer shielding portion 338.

In an exemplary embodiment, the inner conductor 334 and the outer shielding portion 338 each extend beyond the surrounding portion 336 by a first amount (illustrated by arrows 376) and the length of the cylindrical portion 340 is substantially equal to or otherwise corresponds to that amount of extension, so that the cylindrical portion 340 contacts the surrounding portion 336 when the cylindrical portion 340 is inserted within the hollow region defined by the extending portion of the outer shielding portion 338. Thus, there are no interior air gaps or voids between the cylindrical portion 340 and the outer shielding portion 338. In an exemplary embodiment, the cap portion 342 has a diameter (or circumference) that is substantially equal to or otherwise corresponds to the outer diameter (or outer circumference) of the outer shielding portion 338. The cap portion 342 has a length (illustrated by arrows 378) such that the bore 344 provides an air gap 346 at the longitudinal end of the extending portion of the inner conductor 334 that is aligned with, coaxial to and/or concentric with the inner conductor 334. In accordance with one embodiment, the length 378 of the cap portion 342 is greater than about 1 millimeter, and preferably, around 1.5 millimeters. For example, as described above in the context of FIG. 1, the antenna portion 308 and/or cylindrical portion 340 may be inserted into or otherwise disposed within a waveguide (e.g., waveguide 110) capable of directing electromagnetic waves radiating from the air gap 346 into a cavity (or cooking chamber) of a microwave oven (e.g., microwave oven 150). By virtue of the electrical connection between the inner conductor 334 and the outer shielding portion 338 provided by the antenna portion 308, electromagnetic waves corresponding to the oscillating electrical signals propagating along the inner conductor 334 to radiate from the antenna portion 308 and the outer shielding portion 338 into the surrounding medium.

In an exemplary embodiment, the microwave adaptor 300 is inserted within a substantially planar mounting structure 350 that is mounted or otherwise affixed to a waveguide (e.g., waveguide 110). In this regard, the mounting structure 350 includes an opening (or hole) aligned with an input of the waveguide that allows a least a portion of the microwave adaptor 300 to protrude through the mounting structure 350 into the waveguide. In the illustrated embodiment of FIG. 3, the opening conforms to the outer diameter (or circumference) of the second coaxial portion 304 and has a diameter (or circumference) that is less than the diameter (or circumference) of the first coaxial portion 302 so that only the second and third coaxial portions 304, 306 are capable of extending through the mounting structure 350 into the waveguide. In accordance with one or more embodiments, the mounting structure 350 is realized as a conductive material, such as iron or aluminum. In the illustrated embodiment, a first cylindrical mounting structure 352 having an opening (or hole) corresponding to the diameter (or outer circumference) of the first coaxial portion 302 is affixed or otherwise mounted to the mounting structure 350. As illustrated, the length of the first cylindrical mounting structure 352 corresponds to the length of the outer shielding portion 324. In an exemplary embodiment, the first cylindrical mounting structure 352 is realized as aluminum or another conductive material that provides electrical connectivity between the mounting structure 350 and the outer shielding portion 324, so that the outer shielding portion 324, the mounting structure 350, and the first cylindrical mounting structure 352 have the same electrical potential (e.g., ground). A second cylindrical mounting structure 354 having a length substantially equal to the length of the segment of the surrounding dielectric portion 322 that extends from the outer shielding portion 324 and an opening (or hole) that corresponds to or otherwise conforms to the outer surface of the segment of the surrounding dielectric portion 322 that extends from the outer shielding portion 324 is affixed or otherwise mounted to the first cylindrical mounting structure 352. In an exemplary embodiment, the second cylindrical mounting structure 354 is realized as a brass material or another conductive material. The flange portion 356 of the outer shielding segment 324 contacts the cylindrical mounting structures 352, 354 to provide an electrical connection that grounds the second cylindrical mounting structure 354 to the electrical potential of the first cylindrical mounting structure 352. Although not illustrated in FIG. 3, in some embodiments, one or more washers (or spacers) may be disposed between the cylindrical mounting structures 352, 354 to maintain the spacing between the cylindrical mounting structures 352, 354 and protect the flange portion 356. In this regard, the washer may circumscribe the flange portion 356 or have a diameter that is less than the diameter of the flange portion 356 to circumscribe the dielectric portion 322 between the flange portion 356 and the second cylindrical mounting structure 354. The washer may be realized as a brass material or another conductive material. By virtue of the conductivity of the mounting structures 350, 352, 354 and the flange portion 356, the outer shielding portion 324 of the adaptor 300 may be grounded when the adaptor 300 is mounted to a waveguide (e.g., to the same electrical potential as the exterior of the waveguide via mounting structure 350).

Figure 4:
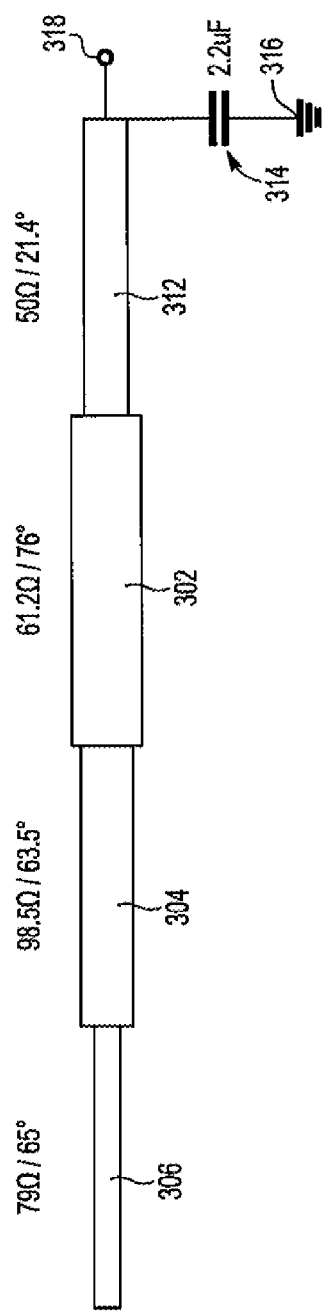
FIG. 4 is a schematic circuit diagram of an equivalent circuit for one embodiment of the adaptor of FIG. 3 that is suitable for use in the oscillator system of FIG. 1.

FIG. 4 illustrates an equivalent circuit for one exemplary embodiment of the microwave adaptor 300 illustrated in FIG. 4 suitable for use in the oscillator system 100 of FIG. 1. In accordance with one embodiment, the input microstrip segment 312 is configured to provide impedance of about 50 ohms at 2.45 GHz and the capacitive element 314 provides a capacitance of about 2.2 picofarads to match the impedance of the microwave adaptor 300 to the impedance at the output node 118 of the oscillator arrangement 102. For the embodiment depicted by FIG. 4, the inner conductor 320 of the first coaxial portion 302 has a diameter (illustrated by arrows 360) of about 3.35 millimeters (0.132 inches), the surrounding portion 322 has a nominal diameter (illustrated by arrows 362) of about 0.1473 meters (0.580 inches), and the inner conductor 320 and the surrounding dielectric portion 322 each have a length (illustrated by arrows 364) of about 0.1789 meters (0.704 inches) to provide an impedance of about 61.2 ohms at 2.45 GHz. As illustrated in FIG. 3, in one embodiment, the surrounding dielectric portion 322 and the outer shielding portion 324 are chamfered at an angle of about 75° (relative to the plane of the planar mounting structure 350) to/from the location where the first cylindrical mounting structure 352 interfaces with the second cylindrical mounting structure 354, and the surrounding dielectric portion 322 is chamfered at an angle of 62° (relative to the plane of the planar mounting structure 350) near the interface with the second coaxial portion 304. For the second coaxial portion 304, the inner conductor 328 has a diameter (illustrated by arrows 366) of about 1 millimeter (0.04 inches), the surrounding portion 330 has a nominal diameter (illustrated by arrows 368) of about 0.1070 meters (0.421 inches), and the inner conductor 328 and the surrounding dielectric portion 330 each have a length (illustrated by arrows 370) of about 0.1488 meters (0.586 inches) to provide an impedance of about 98.5 ohms at 2.45 GHz. As illustrated in FIG. 3, in one embodiment, the surrounding dielectric portion 330 is chamfered at an angle of 56° (relative to the plane of the planar mounting structure 350) near the interface with the third coaxial portion 306. For the third coaxial portion 306, the inner conductor 334 has the same diameter 366 as the inner conductor 328, the surrounding portion 336 has a diameter (illustrated by arrows 372) of about 0.0660 meters (0.260 inches), and the surrounding dielectric portion 336 has a length (illustrated by arrows 374) of about 0.1524 meters (0.600 inches) to provide an impedance of about 79 ohms at 2.45 GHz. Thus, for the embodiment of FIG. 4, the microwave adaptor 300 translates the oscillating electrical signals at the adaptor input node 318 (e.g., output node 118) from a 50 ohm impedance to an impedance of about 288.7 ohms at 2.45 GHz at the input of the waveguide 110. In an exemplary embodiment, the length of the extending portions of the inner conductor 224 and the outer shielding portion 338 (illustrated by arrows 376) is about 6.1 millimeters (0.124 inches) and the length of the cap portion 342 (illustrated by arrows 378) is about 1.52 millimeters (0.06 inches).

Referring now to FIGS. 1-4, one advantage of the oscillator systems described above is that the oscillator systems are capable of producing microwave signals having an equivalent output power to those produced by conventional magnetrons at a lower voltage and without the use of a magnetron. In this regard, in lieu of a magnetron antenna used to transfer microwave signals from the magnetron to a waveguide and/or cavity, the microwave adaptor 108 translates the impedance of the oscillating electrical signals generated by the oscillator arrangement 102 from approximately 50 ohms at the output node 118 of the oscillator arrangement 102 to the input impedance of the waveguide 110 (e.g., approximately 300 ohms) and includes an antenna portion inserted within the waveguide 110 to radiate electromagnetic waves into the waveguide 110. In this regard, by matching the input impedance of the microwave adaptor 108 to the output impedance of the oscillator arrangement 102, the power transfer from the oscillator arrangement 102 to the microwave adaptor 108 is improved, and by matching the output impedance of the microwave adaptor 108 to the input impedance of the waveguide 110, the forward transmission of the electromagnetic waves radiated by the microwave adaptor 108 is improved.

For the sake of brevity, conventional techniques related to resonators, amplifiers, biasing, load modulation, impedance matching, microwave applications, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

In conclusion, an exemplary embodiment of an adaptor is provided. The adaptor comprises an input segment of a conductive material, a first coaxial portion including a first inner conductor coupled to the input segment and a first outer shielding segment, and a capping portion coupled to the first coaxial portion to electrically couple the first inner conductor and the first outer shielding segment. In one embodiment, the capping portion includes an air gap aligned with an end of the first inner conductor. In another embodiment, the adaptor further comprises a second coaxial portion including a second inner conductor coupled between the input segment and the first inner conductor, wherein a diameter of the second coaxial portion is different from a diameter of the first coaxial portion. In yet another embodiment, the adaptor further comprises a second coaxial portion including a second inner conductor coupled between the input segment and the first inner conductor, wherein an impedance of the second coaxial portion is different from an impedance of the first coaxial portion. In accordance with another embodiment, the adaptor further comprises a capacitive element coupled between the input segment and a reference voltage node. In one embodiment, the input segment comprises a microstrip transmission line.

In accordance with another exemplary embodiment, an adaptor is provided that comprises a first coaxial portion having a first diameter, a second coaxial portion having a second diameter, wherein the second diameter is different from the first diameter, the second coaxial portion including an inner conductive portion and an outer shielding segment, and a capping portion coupled to the second coaxial portion to electrically couple the inner conductive portion and the outer shielding segment. In one embodiment, the adaptor further comprises a segment of conductive material coupled to the first coaxial portion and a capacitive element coupled between the segment of conductive material and a reference voltage node. In a further embodiment, the first diameter is greater than the second diameter. In another embodiment, the segment is connected to an inner conductive portion of the first coaxial portion. In accordance with one embodiment, the inner conductive portion of the second coaxial portion has the second diameter, wherein the first coaxial portion includes a second inner conductive portion having the first diameter. In yet another embodiment, the first coaxial portion includes a second inner conductive portion and a first dielectric portion surrounding the second inner conductive portion, the first dielectric portion has the first diameter, the second coaxial portion includes a second dielectric portion surrounding the inner conductive portion, and the second dielectric portion has the second diameter. In one embodiment, the first diameter is greater than the second diameter. In accordance with yet another embodiment, the capping portion includes an opening aligned with the inner conductive portion to provide an air gap at an end of the inner conductive portion. In a further embodiment, the outer shielding segment defines a hollow region having an extending portion of the inner conductive portion disposed therein, the capping portion includes a cylindrical portion of conductive material disposed within the hollow region, the extending portion of the inner conductive portion is disposed within the opening in the cylindrical portion, and the cylindrical portion contacts the inner conductive portion and the outer shielding segment. In accordance with another embodiment, an impedance of the first coaxial portion is different from an impedance of the second coaxial portion.

In accordance with another embodiment, an oscillator system is provided. The oscillator system comprises a waveguide having an input impedance, an oscillator arrangement to generate an oscillating signal at a first node, and an adaptor coupled to the first node. The adaptor comprises an input segment of conductive material coupled to the first node, an antenna portion disposed within the waveguide, and one or more coaxial portions coupled between the antenna portion and the input segment to translate the oscillating signal to the input impedance of the waveguide at the antenna portion. In one embodiment, the oscillator system further comprises a capacitive element coupled between the input segment and a reference voltage node, wherein an impedance of the input segment corresponds to an output impedance at the first node and the one or more coaxial portions are configured to translate the oscillating signal from the output impedance to the input impedance of the waveguide. In another embodiment, the one or more coaxial portions comprise a first coaxial portion having a first inner conductor coupled to the input segment and a second coaxial portion having a second inner conductor coupled to the first inner conductor, wherein a diameter of the first inner conductor is different from a diameter of the second inner conductor. In yet another embodiment, the oscillator arrangement comprises a first amplifier having a first amplifier input and a first amplifier output coupled to the first node, and an annular resonance structure coupled between the first amplifier output and the first amplifier input.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

The invention claimed is:

1. An adaptor, comprising:
an input segment of a conductive material;
a first coaxial portion including a first inner conductor coupled to the input segment and a first outer shielding segment; and
a capping portion coupled to the first coaxial portion to electrically couple the first inner conductor and the first outer shielding segment, wherein the capping portion is disposed within a hollow region defined by the first outer shielding segment.

2. The adaptor of claim 1, wherein the capping portion includes an air gap aligned with an end of the first inner conductor.

3. An adaptor, comprising:
an input segment of a conductive material;
a first coaxial portion including a first inner conductor coupled to the input segment and a first outer shielding segment;
a second coaxial portion including a second inner conductor coupled between the input segment and the first inner conductor, wherein a diameter of the second coaxial portion is different from a diameter of the first coaxial portion; and
a capping portion coupled to the first coaxial portion to electrically couple the first inner conductor and the first outer shielding segment.

4. An adaptor, comprising:
an input segment of a conductive material;
a first coaxial portion including a first inner conductor coupled to the input segment and a first outer shielding segment;
a second coaxial portion including a second inner conductor coupled between the input segment and the first inner conductor, wherein an impedance of the second coaxial portion is different from an impedance of the first coaxial portion; and
a capping portion coupled to the first coaxial portion to electrically couple the first inner conductor and the first outer shielding segment.

5. An adaptor, comprising:
an input segment of a conductive material;
a first coaxial portion including a first inner conductor coupled to the input segment and a first outer shielding segment;
a capping portion coupled to the first coaxial portion to electrically couple the first inner conductor and the first outer shielding segment; and
a capacitive element coupled between the input segment and a reference voltage node.

6. An adaptor, comprising:
an input segment of a conductive material, wherein the input segment comprises a microstrip transmission line;
a first coaxial portion including a first inner conductor coupled to the input segment and a first outer shielding segment; and
a capping portion coupled to the first coaxial portion to electrically couple the first inner conductor and the first outer shielding segment.

7. An adaptor, comprising:
a first coaxial portion having a first diameter;
a second coaxial portion having a second diameter, wherein the second diameter is different from the first diameter, the second coaxial portion including an inner conductive portion and an outer shielding segment; and
a capping portion coupled to the second coaxial portion to electrically couple the inner conductive portion and the outer shielding segment.

8. The adaptor of claim 7, further comprising:
a segment of conductive material coupled to the first coaxial portion; and
a capacitive element coupled between the segment of conductive material and a reference voltage node.

9. The adaptor of claim 8, wherein the first diameter is greater than the second diameter.

10. The adaptor of claim 8, wherein the segment is connected to an inner conductive portion of the first coaxial portion.

11. The adaptor of claim 7, the inner conductive portion of the second coaxial portion having the second diameter, wherein the first coaxial portion includes a second inner conductive portion having the first diameter.

12. The adaptor of claim 7, wherein:
the first coaxial portion includes a second inner conductive portion and a first dielectric portion surrounding the second inner conductive portion;
the first dielectric portion has the first diameter;
the second coaxial portion includes a second dielectric portion surrounding the inner conductive portion; and
the second dielectric portion has the second diameter.

13. The adaptor of claim 12, wherein the first diameter is greater than the second diameter.

14. The adaptor of claim 7, wherein the capping portion includes an opening aligned with the inner conductive portion to provide an air gap at an end of the inner conductive portion.

15. The adaptor of claim 14, wherein:
the outer shielding segment defines a hollow region having an extending portion of the inner conductive portion disposed therein;
the capping portion includes a cylindrical portion of conductive material disposed within the hollow region;
the extending portion of the inner conductive portion is disposed within the opening in the cylindrical portion; and
the cylindrical portion contacts the inner conductive portion and the outer shielding segment.

16. The adaptor of claim 7, wherein an impedance of the first coaxial portion is different from an impedance of the second coaxial portion.

17. An oscillator system, comprising:
a waveguide having an input impedance;
an oscillator arrangement to generate an oscillating signal at a first node; and
an adaptor coupled to the first node, the adaptor comprising:
an input segment of conductive material coupled to the first node;
an antenna portion disposed within the waveguide; and
one or more coaxial portions coupled between the antenna portion and the input segment to translate the oscillating signal to the input impedance of the waveguide at the antenna portion.

18. The oscillator system of claim 17, further comprising a capacitive element coupled between the input segment and a reference voltage node, wherein:
an impedance of the input segment corresponds to an output impedance at the first node; and
the one or more coaxial portions are configured to translate the oscillating signal from the output impedance to the input impedance of the waveguide.

19. The oscillator system of claim 17, wherein the one or more coaxial portions comprise:

a first coaxial portion having a first inner conductor coupled to the input segment; and a second coaxial portion having a second inner conductor coupled to the first inner conductor, wherein a diameter of the first inner conductor is different from a diameter of the second inner conductor.

20. The oscillator system of claim 17, wherein the oscillator arrangement comprises:

a first amplifier having a first amplifier input and a first amplifier output coupled to the first node; and an annular resonance structure coupled between the first amplifier output and the first amplifier input.

\* \* \* \* \*